Oct. 17, 1944. G. E. PORTER 2,360,578
POWER BRAKE
Filed Aug. 26, 1942

Inventor:
GILBERT E. PORTER,
By
Attorney.

Patented Oct. 17, 1944

2,360,578

UNITED STATES PATENT OFFICE 2,360,578

POWER BRAKE

Gilbert E. Porter, Hollywood, Calif.

Application August 26, 1942, Serial No. 456,187

5 Claims. (Cl. 60—54.6)

My invention relates to hydraulic devices which are operated by the controlled application of fluid under pressure, and relates in particular to a fluid applying device especially useful for the operation of hydraulic brakes of aircraft and automotive vehicles.

It is an object of the invention to provide a device for applying fluid under pressure to an expansible unit such as a hydraulic brake cylinder, wherein the force applied to the expansible unit is a predetermined multiple of the force applied to an actuator, such as an operating lever or foot pedal, and whereby the operator, by expenditure of a relatively small effort, may cause and control the application to the brakes of a force of ample magnitude for the braking effect to be accomplished.

It is an object of the invention to provide brake operating means having maximum sensitivity in response to control. This sensitivity makes possible the substantially instantaneous application of the brakes from a release or applied condition, thereby avoiding delay encountered in many brake devices between the time the control is first applied to the operating lever and the time the brakes are actuated, and also the fault found in many hydraulic brakes, especially those used in aircraft, over-application of the brakes is avoided. Over-application of the brakes when the controls are first operated often results in loss of control of the aircraft, or at least causes a jerky retarding of the speed of the aircraft on the ground.

A further object of the invention is to provide a brake operating means which gives continuous and sensitive control of the brakes, so that there is no liability of the braking effect running away from the actuator or foot pedal. In the invention the movement of its pressure applying piston is maintained always in unison with the movement of the operating lever or foot pedal, thereby avoiding the difficulties found in many brakes, consisting in an initial application of fluid pressure to the hydraulic brakes materially in excess of the intentions of the operator.

A further object of the invention is to provide a brake operating device having a fluid pressure receiving chamber with a wall moved by fluid pressure therein, the movement of this wall being duplicated in the wall of a fluid transmitting chamber which is connected to the brake cylinder, and a device for controlling admission of fluid to the first chamber, this valve being so constructed and associated with other parts of the device that a close control of the movement of the movable wall and the discharge of fluid from the fluid pressure transmitting chamber is attained.

Further objects and advantages of the invention will be brought out hereinafter.

Referring to the drawing which is for illustrative purposes only,

Figures 1, 2, 3:
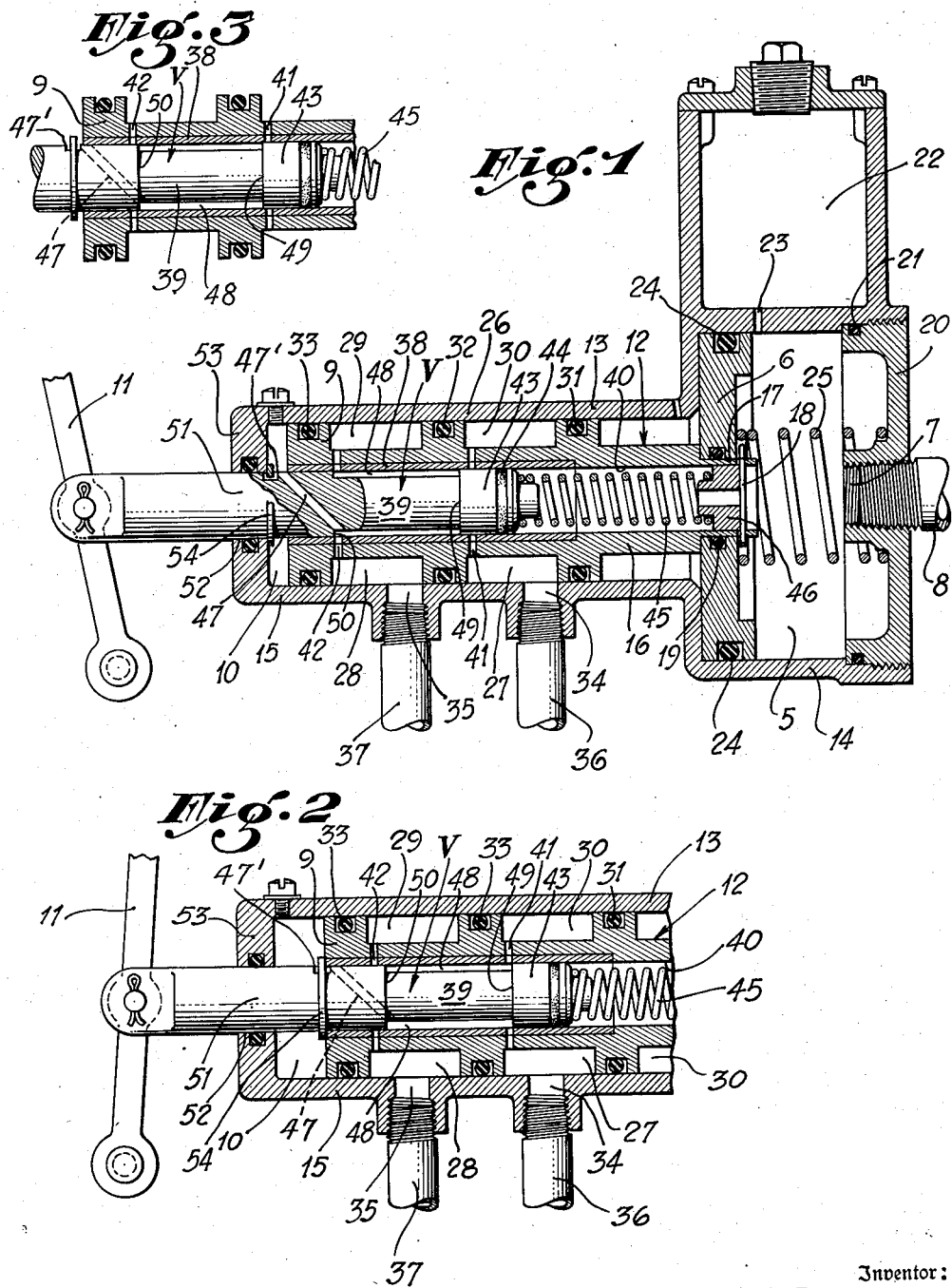
Fig. 1 is a sectional view of a preferred form of my invention.
Fig. 2 is a fragmentary sectional view showing the valve member in another of its cooperating positions.
Fig. 3 is a fragmentary sectional view showing the valve parts in flow restricting position.

The embodiment of my invention shown in the drawing has a fluid transmitting chamber 5 having a movable wall 6, which, by rightward movement from the position in which it is shown, will place the liquid content of the chamber 5 under pressure and force the same through a service port 7 and interconnecting conduit 8 to an expansible unit such as the cylinder of a hydraulic brake, for example. The movable wall 6 is connected to a movable wall 9 forming one of the bounds of a fluid receiving chamber 10. Valve means V are provided which may be controlled by an actuator 11, shown simply as a lever, for admitting fluid under pressure into the chamber 10, or releasing fluid therefrom, in order to move the wall 9 and produce a proportionate movement of the wall 6.

In the simple construction shown, the walls 6 and 9 comprise opposite extremities of a piston member 12 axially movable in a shell 13 which provides a cylinder 14 in which the wall 6 is movable and a cylinder 15 in which the wall 9 is movable, these cylinders 14 and 15 comprising outer walls of the chambers 5 and 10. The piston member 12 comprises a tubular wall 16 having a diametrally reduced rightward end portion 17 on which the wall 6 is secured by means of a transverse cotter pin 18, there being a sealing member 19 for preventing leakage of fluid through the joint formed between the wall 6 and the diametrally reduced portion 17 of the tubular wall 16. The service port 7 is formed in a closure plate 20 which forms an end wall for the chamber 5 and is provided with a sealing ring 21. A chamber 22 for reserve fluid may be formed on the cylinder 14, this chamber 22 communicating with the chamber 5 through an opening 23. The movable wall 6, which forms a piston slidable in the cylinder 14, has a peripheral seal 24 shown as a ring of synthetic rubber resting in a peripheral channel in the movable wall 6. A compression spring 25, placed between the end cap 20 and the movable wall 6, urges the piston member 12 leftward into the position in which it is shown in Fig. 1.

The intermediate portion 26 of the shell 13 cooperates with the piston member 12 so as to provide therebetween a fluid inlet chamber 27 and a fluid outlet chamber 28. These chambers 27 and 28 are annular and are preferably formed by channels 29 and 30 in the circumference of the piston member 12. The inlet and outlet chambers 27 and 28 are sealed by means of sealing rings 31, 32, and 33, slidably engaging the inner face of the intermediate portion 26 of the shell 13 which has inlet and outlet ports 34 and 35 respectively connecting inlet and return conduits 36 and 37 with the inlet and outlet chambers 27 and 28. The chambers 27 and 28 are of such axial dimension that they will be always in communication with the ports 34 and 35 during all of the operative positions of the piston member 12.

The valve means V comprises a part 38 having movement corresponding to the movement of the movable walls 6 and 9, and a part 39 having movement in accordance with the movement of the actuator 11. The part 38 comprises a cylindric sleeve set into the leftward end of an opening or bore 40 which extends from end to end of the piston member 12. The sleeve or cylinder 38 has fluid admission valve ports 41 which communicate with the fluid inlet chamber 27 and fluid release valve ports 42 which connect the inner face of the sleeve 38 with the fluid outlet chamber 28.

The part 39 of the valve V, which is connected to the actuator 11, comprises a plunger 43, equipped with a sealing ring 44, which is slidable in the bore or opening of the piston member 12. A compression spring 45 is disposed between the leftward end of the plunger 43 and a perforated plug 46 which is held in the rightward end of the bore 40 by the cotter pin 18, this spring yieldably urging the valve part 39 leftward toward the retracted position in which it is shown in Fig. 1. The valve member 39 has therein a passage 47 which connects the fluid pressure receiving chamber 10 at all times with a zone inside the valve sleeve 38. The leftward end of the passage is at all times connected to the chamber 10 through a groove 47' in the surface of the part 39 and the rightward end of the passage 47 comprises an annular channel 48 of axial length slightly less than the axial distance between the ports 41 and 42, so that when the valve part 39 is in the flow restricting position thereof, shown in Fig. 3, the shoulders 49 and 50 at the ends of the channel 48 will close the ports 41 and 42. The actuated valve part 39 has a cylindric portion 51 which projects through an opening 52 in the end wall 53 of the shell 13 and has thereon a snap ring 54 within the chamber 10, which passes over the groove 47' and is positioned so as to engage the end wall 53 so as to limit the leftward or outward movement of the valve part 39. When the parts of the device are in the retracted or inactive position shown in Fig. 1, the ring 54 is spaced from the leftward end of the piston member 12 a distance whch will permit valve actuating movement of the part 39 before engaging the leftward end of the piston member 12.

When the device is in inactive condition as shown in Fig. 1, the passage 47 communicates through the port 42 with the outlet chamber 28 which is connected through the conduit 37 with a zone of low pressure, such as a reservoir, so that low pressure exists in the chamber 10. At this time the shoulder 49 closes the fluid admission port 41. At this time therefore the spring 25 holds the piston member 12 in its leftward or retracted position shown in Fig. 1.

When it is desired to operate the brake or other expansible unit to which the device is connected through the conduit 8, the actuator 11 is moved in rightward direction so as to shift the valve part 39 rightward into a position wherein the ring or shoulder 54 engages the leftward end of the cylinder member 12. When this is done, the shoulder 50 of the member 39 will close the fluid releasing ports 42 and the shoulder 49 will occupy a position to the right of the fluid admission ports 41, permitting fluid under pressure to flow from the chamber 27 through the channel 48 and the remainder of the passage 47 into the fluid pressure receiving chamber 10, and rightward movement of the piston member 12 will be accomplished. The rightward end of the piston member 12, formed by the movable wall 6, will place the fluid in the chamber 5 under pressure and will force some of this fluid out through the service port 7 and the conduit 8 leading to the device which is to be operated. The force required to initially move the member 39 in rightward direction is not large, owing to the low pressure in the chamber 5, and as pressure is built up in the chamber 5, a proportionate pressure will be transmitted through the plug 46 to the rightward end of the plunger 43. Ordinarily this build-up in pressure against the rightward end of the plunger 43 will tend to shift the valve part 39 a short distance leftward or outward against the rightward force applied to the actuator 11 by the operator. This slight leftward movement of the valve part 39 will be felt by the operator who will then initiate an additional muscular effort against the actuator 11 to resist leftward movement of the valve part 39 and to urge the valve part 39 rightward in accordance with the braking effect desired, which the operator will determine not only from the change in movement of the vehicle or aircraft, but also from the reacting force or feelback felt through the actuator 11.

As long as the operator holds the valve part 39 in the relative position in which it is shown in Fig. 2, which will require a gradual increase in the pressure applied to the actuator 11 to move the valve part 39 rightward at the same rate as the rightward movement of the piston member 12, the admission valve port 41 will be maintained opened and in communication with the chamber 10. But, should the valve part 39 be held substantially sationary, or should there be a leftward movement thereof either due to a build-up in pressure against the rightward end thereof or a release in the force applied thereto through the actuator 11, the relative movement of the valve part 39 and of the sleeve 38, movement of which is controlled by the movement of the piston member 12, will bring the shoulders or closures 49 and 50 into the flow restricting position thereof shown in Fig. 3, wherein both ports 41 and 42 will be closed so that there will be no further feeding of fluid under pressure into the chamber 10 and release of fluid from the chamber 10 cannot occur. At this time a volume of fluid in the fluid pressure receiving chamber 10 will be held constant and there will be no movement of the piston member 12. Also, the force which must be exerted by the operator through the actuator 11 to hold the valve part 39 in this position relative to the valve sleeve 38 will be proportionate to the force exerted leftward against the movable wall 6, owing to the fact that the rightwardly presented area of the movable wall 6 is a fixed multiple of the area presented rightward by the plunger 43 forming the rightward end of the valve part 39. Should there be a build-up in pressure in the chamber 5, the same will be immediately felt by the operator, and should the operator desire to release the braking effect, he need only slightly diminish the force applied rightward through the actuator 11 so as to permit a small leftward movement of the valve part 39 from the position in which it is shown in Fig. 3, thereby opening the fluid releasing ports so as to permit an amount of fluid to escape from the chamber 10 into the fluid outlet chamber 26 which communicates through the conduit 37 with a zone of low fluid pressure. When the piston member 12 is in an intermediate position and the valve parts 38 and 39 are in the relative positions thereof shown in Fig. 3, a movement of the valve part 39 either rightward or leftward from the position in which it is shown will result in a like movement of the piston member 12 to bring the valve parts 38 and 39 back to the flow restricting position thereof.

A feature of the invention is that the movable walls 6 and 9 may be of different diameters or areas, and when in use on aircraft, the movable wall 6 may have an area which is a multiple of the area of the leftward end of the piston member 12, so that the quantity of fluid transmitted from the chamber 5 through the service port 7 will be large in volume as compared to the fluid fed into the chamber 10 at high pressure to operate the device. The feed conduit 36 may be connected to the hydraulic supply system of the aircraft carrying therein hydraulic fluid at a pressure often in excess of one thousand pounds. The opposite ends of the piston member 12 may be designed so that under these conditions the fluid discharged from the chamber 5 may have a maximum pressure of around three hundred and fifty pounds with the valve ports 41 fully opened. Not only does the cooperative arrangement of the parts shown give rapid operation of the brakes and sensitivity of control, but it also provides quick release of pressure from the valve cylinders, owing to the large volume of fluid drawn into the chamber 5 when the piston member 12 moves leftward, as compared to the volume of fluid which must be discharged from the chamber 10.

I claim as my invention:

1. In a fluid operated device of the character described, for applying fluid under pressure to an expansible unit, and adapted to be controlled by an actuator, the combination of: a double ended piston member having an opening lengthwise thereof, said piston member having axially spaced inlet and outlet ports connecting said opening with axially spaced circumferential faces of said piston member; means forming a pressure receiving cylinder to receive the front end of said piston member; means forming a pressure transmitting cylinder to receive the rear end of said piston member, said pressure transmitting cylinder having a service port for connection to a device which is to receive fluid under pressure; a cylindric wall cooperating with the exterior of said piston member to form in axially spaced relation a fluid inlet chamber and a fluid outlet chamber continuously connected respectively with said inlet and outlet ports; valve means for controlling a flow of fluid into and out of said pressure receiving cylinder comprising a valve plunger extending into said opening of said piston member and being axially movable therein between fluid releasing, flow restricting, and fluid admitting positions, said plunger having a depression intermediate the ends of its external face, there being passage means to connect this depression continuously to said pressure receiving cylinder, said plunger having shoulders at the ends of said depression spaced axially a distance less than the axial distance between said inlet and outlet ports of said piston member positioned so as to close both said inlet port and said outlet port when said plunger is in said flow-restricting position thereof, so as to open only said outlet port to communication with said depression when said plunger is in said fluid releasing position and so as to open only said inlet port to communication with said depression when said plunger is in said fluid admitting position.

2. In a fluid operated device of the character described, for applying fluid under pressure to an expansible unit, and adapted to be controlled by an actuator, the combination of: a double ended piston member having an opening from end to end thereof, said piston member having axially spaced inlet and outlet ports connecting said opening with axially spaced circumferential faces of said piston member; means forming a pressure receiving cylinder to receive the front end of said piston member; means forming a pressure transmitting cylinder to receive the rear end of said piston member, said pressure transmitting cylinder having a service port for connection to a device which is to receive fluid under pressure, and a cylindric wall cooperating with the exterior of said piston member to form in axially spaced relation a fluid inlet chamber and a fluid outlet chamber continuously connected respectively with said inlet and outlet ports; valve means for controlling a flow of fluid into and out of said pressure receiving cylinder comprising a valve plunger extending into said opening of said piston member and being axially movable therein between fluid releasing, flow restricting, and fluid admitting positions, said plunger having a depression intermediate the ends of its external face, there being passage means to connect this depression continuously to said pressure receiving cylinder, said plunger having shoulders at the ends of said depression spaced axially a distance less than the axial distance between said inlet and outlet ports of said piston member positioned so as to close both said inlet port and said outlet port when said plunger is in said flow-restricting position thereof, so as to open only said outlet port to communication with said depression when said plunger is in said fluid releasing position and so as to open only said inlet port to communication with said depression when said plunger is in said fluid admitting position; means connecting said plunger to said actuator; spring means operating between said plunger and said cylinder member to move said plunger toward said fluid releasing position thereof; and a shoulder on said plunger engageable with said piston member when said plunger is in said fluid admitting position, whereby movement of said plunger may be transmitted to said piston member.

3. In a fluid operated device of the character described, for applying fluid under pressure to an expansible unit, and adapted to be controlled by an actuator, the combination of: a double ended piston member having an opening lengthwise thereof, said piston member having axially spaced inlet and outlet ports connecting said opening with axially spaced circumferential faces of said piston member, and said piston member having axially spaced external annular channels communicating respectively with the outer ends of said inlet and outlet ports; means forming a pressure receiving cylinder to receive the front end of said piston member; means forming a pressure transmitting cylinder to receive the rear end of said piston member, said pressure transmitting cylinder having a service port for connection to a device which is to receive fluid under pressure; a cylindric wall cooperating with the exterior of said piston member to form of said annular channels respectively a fluid inlet chamber and a fluid outlet chamber, and fluid inlet and outlet openings respectively continuously communicating through said cylindric wall with said inlet and outlet chambers; valve means for controlling a flow of fluid into and out of said pressure receiving cylinder comprising a valve plunger extending into said opening of said piston member and being axially movable therein between fluid releasing, flow restricting, and fluid admitting position, said plunger having a depression intermediate the ends of its external face, there being passage means to connect this depression continuously to said pressure receiving cylinder, said plunger having shoulders at the ends of said depression spaced axially a distance less than the axial distance between said inlet and outlet ports of said piston member positioned so as to close both said inlet port and said outlet port when said plunger is in said flow-restricting position thereof, so as open only said outlet port to communication with said depression when said plunger is in said fluid releasing position and so as to open only said inlet port to communication with said depression when said plunger is in said fluid admitting position.

4. In a fluid operated device of the character described, for applying fluid under pressure to an expansible unit, and adapted to be controlled by an actuator, the combination of: a double ended piston member having an opening from end to end thereof, said piston member having axially spaced inlet and outlet ports connecting said opening with axially spaced circumferential faces of said piston member, and said piston member having axially spaced external annular channels communicating respectively with the outer ends of said inlet and outlet ports; means forming a pressure receiving cylinder to receive the front end of said piston member; means forming a pressure transmitting cylinder to receive the rear end of said piston member, said pressure transmitting cylinder having a service port for connection to a device which is to receive fluid under pressure, and a cylindric wall cooperating with the exterior of said piston member to form of said annular channels respectively a fluid inlet chamber and a fluid outlet chamber, and fluid inlet and outlet openings respectively continuously communicating through said cylinder wall with said inlet and outlet chambers; valve means for controlling a flow of fluid into and out of said pressure receiving cylinder comprising a valve plunger extending into said opening of said piston member and being axially movable therein between fluid releasing, flow restricting, and fluid admitting positions, said plunger having a depression intermediate the ends of its external face, there being passage means to connect this depression continuously to said pressure receiving cylinder, said plunger having shoulders at the ends of said depression spaced axially a distance less than the axial distance between said inlet and outlet ports of said piston member positioned so as to close both said inlet port and said outlet port when said plunger is in said flow-restricting position thereof, so as to open only said outlet port to communication with said depression when said plunger is in said fluid releasing position and so as to open only said inlet port to communication with said depression when said plunger is in said fluid admitting position; means connecting said plunger to said actuator; spring means operating between said plunger and said cylinder member to move said plunger toward said fluid releasing position thereof; and a shoulder on said plunger engageable with said piston member when said plunger is in said fluid admitting position, whereby movement of said plunger may be transmitted to said piston member.

5. In a fluid operated device of the character described, for applying fluid under pressure to an expansible unit, and adapted to be controlled by an actuator, the combination of: a double ended piston member having an opening from end to end thereof, said piston member having axially spaced inlet and outlet ports connecting said opening with axially spaced circumferential faces of said piston member, and said piston member having axially spaced external annular channels communicating respectively with the outer ends of said inlet and outer ports; means forming a pressure receiving cylinder to receive the front end of said piston member; means forming a pressure transmitting cylinder to receive the rear end of said piston member, said pressure transmitting cylinder having a service port for connection to a device which is to receive fluid under pressure, and a cylindric wall cooperating with the exterior of said piston member to form of said annular channels respectively a fluid inlet chamber and a fluid outlet chamber, and fluid inlet and outlet openings respectively continuously communicating through said cylindric wall with said inlet and outlet chambers; valve means for controlling a flow of fluid into and out of said pressure receiving cylinder comprising a cylindric bar of constant diameter forming a valve plunger extending into said opening of said piston member and being axially movable therein between fluid releasing, flow-restricting, and fluid admitting positions, said plunger having a depression intermediate the ends of its external face and a diagonal passage extending through said plunger so as to connect this depression continuously to said pressure receiving cylinder, said plunger having shoulders at the ends of said depression spaced axially a distance less than the axial distance between said inlet and outlet ports of said piston member positioned so as to close both said inlet port and said outlet port when said plunger is in said flow-restricting position thereof, so as to open only said outlet port to communication with said depression when said plunger is in said fluid releasing position and so as to open only said inlet port to communication with said depression when said plunger is in said fluid admitting position; means connecting said plunger to said actuator; spring means operating between said plunger and said cylinder member to move said plunger toward said fluid releasing position thereof; and a ring detachably secured on said bar adjacent the front end of said piston member to form a shoulder on said plunger engageable with said piston member when said plunger is in said fluid admitting position, whereby movement of said plunger may be transmitted to said piston member.

GILBERT E. PORTER.